(12) United States Patent
Farris

(10) Patent No.: US 10,701,920 B2
(45) Date of Patent: Jul. 7, 2020

(54) CARRY AND STORAGE DEVICE FOR FISHING LURES

(71) Applicant: David Farris, Portland, OR (US)

(72) Inventor: David Farris, Portland, OR (US)

(*) Notice: Subject to any disclaimer, the term of this patent is extended or adjusted under 35 U.S.C. 154(b) by 365 days.

(21) Appl. No.: 15/065,642

(22) Filed: Mar. 9, 2016

(65) Prior Publication Data

US 2016/0262364 A1 Sep. 15, 2016

Related U.S. Application Data

(60) Provisional application No. 62/130,760, filed on Mar. 10, 2015.

(51) Int. Cl.
*A01K 97/06* (2006.01)

(52) U.S. Cl.
CPC ................. *A01K 97/06* (2013.01)

(58) Field of Classification Search
CPC ........................................ A01K 97/06
USPC ................. 43/54.1, 57.1, 57.2; 206/315.11; 220/920
See application file for complete search history.

(56) References Cited

U.S. PATENT DOCUMENTS

| | | | | |
|---|---|---|---|---|
| 417,979 A | * | 12/1889 | Borcherdt | A01K 97/06 220/522 |
| 578,458 A | * | 3/1897 | Knieriemen | A01K 97/06 43/57.1 |
| 952,314 A | * | 3/1910 | Ellsworth | A01K 97/06 43/57.1 |
| 1,766,553 A | * | 6/1930 | Shriver | A01K 97/06 190/17 |
| 1,858,539 A | * | 5/1932 | Dewey | B25H 3/023 190/17 |
| 2,447,105 A | * | 8/1948 | Vogel | A01K 97/06 206/315.11 |

(Continued)

FOREIGN PATENT DOCUMENTS

| | | | | |
|---|---|---|---|---|
| DE | 9614538 U1 | * | 10/1996 | ............. A01K 97/06 |
| FR | 990891 A | * | 9/1951 | ............. A01K 97/06 |

(Continued)

OTHER PUBLICATIONS

Translation of FR 2761231.*

(Continued)

*Primary Examiner* — Darren W Ark
(74) *Attorney, Agent, or Firm* — Schwabe, Williamson & Wyatt, P.C.

(57) ABSTRACT

Embodiments provide a carry and storage device for storing a fishing lure having a hook and a body. In one instance, the device may comprise a device body having a fishing lure storage slot disposed inside the device body to receive a fishing lure and a lid. The lid is movable between an open position to expose the slot for placing the fishing lure inside and a closed position to cover the slot. In example embodiments, the lid includes a hook holding element disposed inside the lid, to receive at least a portion of the fishing lure hook in response to at least partial disposition of the fishing lure in the slot. The fishing lure hook, in response to a movement of the lid between the open and closed positions, pushes the fishing lure body inside the slot, to place the fishing lure substantially inside the slot.

13 Claims, 5 Drawing Sheets

(56) References Cited

U.S. PATENT DOCUMENTS

| | | | | |
|---|---|---|---|---|
| 2,499,042 A * | 2/1950 | Vogel | A01K 97/06 | 43/57.1 |
| 2,729,913 A * | 1/1956 | Holwerda | A01K 97/06 | 206/315.11 |
| 2,762,157 A * | 9/1956 | Tompkins | A01K 97/06 | 43/57.2 |
| 2,889,658 A * | 6/1959 | Shanks | A01K 97/06 | 43/57.1 |
| 3,277,599 A * | 10/1966 | Griffeth | A01K 97/04 | 224/199 |
| 3,346,313 A * | 10/1967 | Fee | A01K 97/06 | 312/234.1 |
| 3,350,810 A * | 11/1967 | Warner | A01K 97/06 | 206/315.11 |
| 3,377,736 A * | 4/1968 | Woolworth | A01K 97/06 | 43/57.1 |
| 3,512,295 A * | 5/1970 | La Barge | A01K 97/06 | 43/57.1 |
| 3,639,021 A * | 2/1972 | Fee | A01K 97/06 | 206/315.11 |
| 3,668,802 A * | 6/1972 | Benward | A01K 97/06 | 224/245 |
| 3,680,750 A * | 8/1972 | Franco | A01K 97/06 | 206/818 |
| 3,739,518 A * | 6/1973 | Ziegler | A01K 97/06 | 206/315.11 |
| 3,797,161 A * | 3/1974 | Smallwood | A01K 97/06 | 43/57.1 |
| 3,832,798 A * | 9/1974 | Pilston | A01K 97/06 | 43/57.2 |
| 4,006,553 A * | 2/1977 | Porter | A01K 97/06 | 206/315.11 |
| 4,073,085 A * | 2/1978 | Stremeckus | A01K 97/06 | 43/54.1 |
| 4,516,707 A * | 5/1985 | Crapanzano | A01K 97/06 | 206/315.11 |
| 4,729,474 A * | 3/1988 | Lanius | A01K 97/06 | 206/315.1 |
| 4,827,658 A * | 5/1989 | Wolniak | A01K 97/06 | 43/54.1 |
| 4,972,625 A * | 11/1990 | Barnes | A01K 97/06 | 206/315.11 |
| 5,123,199 A * | 6/1992 | Lysohir | A01K 97/06 | 43/25.2 |
| 5,392,557 A * | 2/1995 | Harmon | A01K 97/06 | 206/315.11 |
| 5,440,829 A * | 8/1995 | Parvin | A01K 97/06 | 43/57.1 |
| 5,526,927 A * | 6/1996 | McLemore | A01K 97/06 | 206/315.11 |
| 5,934,464 A * | 8/1999 | Vargo | A01K 97/06 | 206/315.11 |
| 5,941,017 A * | 8/1999 | Junck | A01K 97/06 | 43/57.2 |
| D431,626 S * | 10/2000 | Troyer | D22/133 | |
| 6,230,966 B1 * | 5/2001 | Beales | B65D 85/1045 | 206/434 |
| 6,367,190 B1 * | 4/2002 | Looney | A01K 97/06 | 43/57.1 |
| 6,550,629 B1 * | 4/2003 | Pfister | A01K 97/04 | 220/507 |
| 8,205,376 B1 * | 6/2012 | Hughes | A01K 97/06 | 43/57.2 |
| 8,468,740 B1 * | 6/2013 | Ryckman | A01K 97/06 | 206/315.11 |
| 9,622,463 B2 * | 4/2017 | Thompson | A01K 85/16 | |
| 2008/0222941 A1 * | 9/2008 | Scrimgeour | A01K 91/18 | 43/54.1 |
| 2014/0083881 A1 * | 3/2014 | Oberacker | A01K 97/06 | 206/315.11 |
| 2016/0143261 A1 * | 5/2016 | Oberacker | A01K 97/06 | 206/315.11 |

FOREIGN PATENT DOCUMENTS

| | | | | |
|---|---|---|---|---|
| FR | 1108222 A * | 1/1956 | | A01K 97/06 |
| FR | 2477834 A1 * | 9/1981 | | A01K 97/06 |
| FR | 2551320 A1 * | 3/1985 | | A01K 97/06 |
| FR | 2568449 A1 * | 2/1986 | | A01K 97/06 |
| FR | 2761231 A1 * | 10/1998 | | A01K 97/06 |
| GB | 190903025 A * | 4/1909 | | A01K 97/06 |
| GB | 191414210 A * | 9/1914 | | A01K 97/06 |
| GB | 1032234 A * | 6/1966 | | A01K 97/06 |
| GB | 1564705 A * | 4/1980 | | A01K 97/06 |
| GB | 2187721 A * | 9/1987 | | A01K 97/06 |
| GB | 2324234 A * | 10/1998 | | A01K 97/06 |
| JP | H0652459 U * | 7/1994 | | |
| JP | 8001670 Y2 * | 1/1996 | | |
| JP | 08163945 A * | 6/1996 | | |
| JP | 08228654 A * | 9/1996 | | |
| JP | 2954558 B2 * | 9/1999 | | |
| JP | 11318301 A * | 11/1999 | | |
| JP | 2002171885 A * | 6/2002 | | |
| JP | 2003204745 A * | 7/2003 | | |
| JP | 2006262747 A * | 10/2006 | | |
| JP | 3134006 U * | 8/2007 | | |
| JP | 2010136673 A * | 6/2010 | | |
| JP | 2012115198 A * | 6/2012 | | |
| JP | 2013039051 A * | 2/2013 | | |
| KR | 20070000963 U * | 8/2007 | | |
| WO | WO-2015081173 A1 * | 6/2015 | | A01K 97/06 |

OTHER PUBLICATIONS

Translation of JP 06-052459.*
Translation of JP 2006-262747.*
Translation of JP 2010-136673.*

* cited by examiner

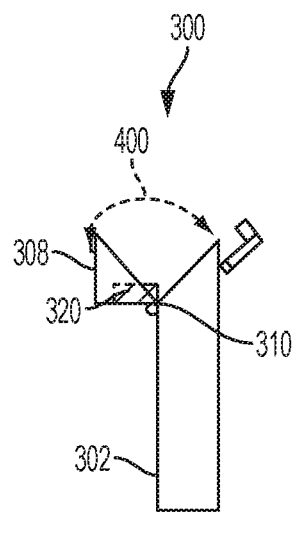 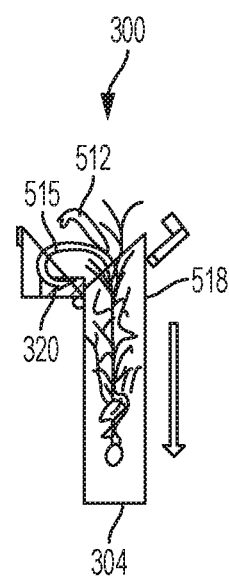
FIG. 4　　　　FIG. 5
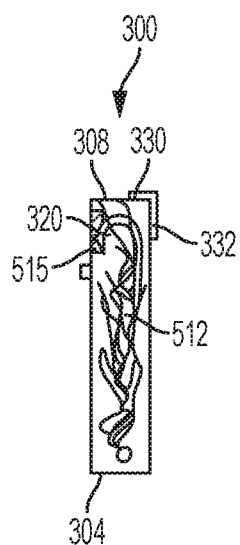 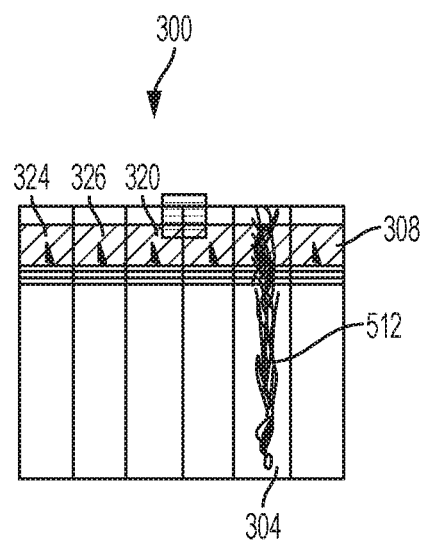
FIG. 6　　　　FIG. 7

CARRY AND STORAGE DEVICE FOR FISHING LURES

CROSS-REFERENCE TO RELATED APPLICATION

This application claims the priority benefit of the earlier filing date of U.S. Provisional Patent Application No. 62/130,760, filed Mar. 10, 2015, which is herein incorporated by reference in its entirety.

FIELD

Embodiments of the present disclosure generally relate to the field of fishing, and more particularly, to a device for storing fishing lures, such as flies.

BACKGROUND

In fly fishing, flies, and in particular articulated flies, have grown in popularity to become the lure of choice in many pursuits, notably steelhead fishing. These include Mother of All Leeches® (MOAL), string leeches, Pick-Yer-Pockets®, Intruders® and any number of variants. These flies are typically 2½ to 4 inches long with a head end made from a straight metal shaft with an eye for tying on a flexible segment of varying length, usually stout string or wire, and a trailing "stinger" hook. The feathers, fur, synthetic material, etc., are primarily attached to the shaft at the head end.

Fly storing devices, such as fly boxes, particularly those carried in pockets on the water typically secure the hook to keep flies organized and accessible. Conventional flies, built onto a single solid segment (hook), are easily accommodated. With articulated flies, however, merely securing the hook leaves the head ends free to tangle with other head ends or hooks. Also, these flies often sport billowing strands of feathers and synthetic flash strips which are hard to contain within the box and keep separate from other flies, furthering the disorder.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 4-8 illustrate different views of an example of a carry and storage device for storing fishing lures, in accordance with some embodiments.

DETAILED DESCRIPTION

Figure 1:
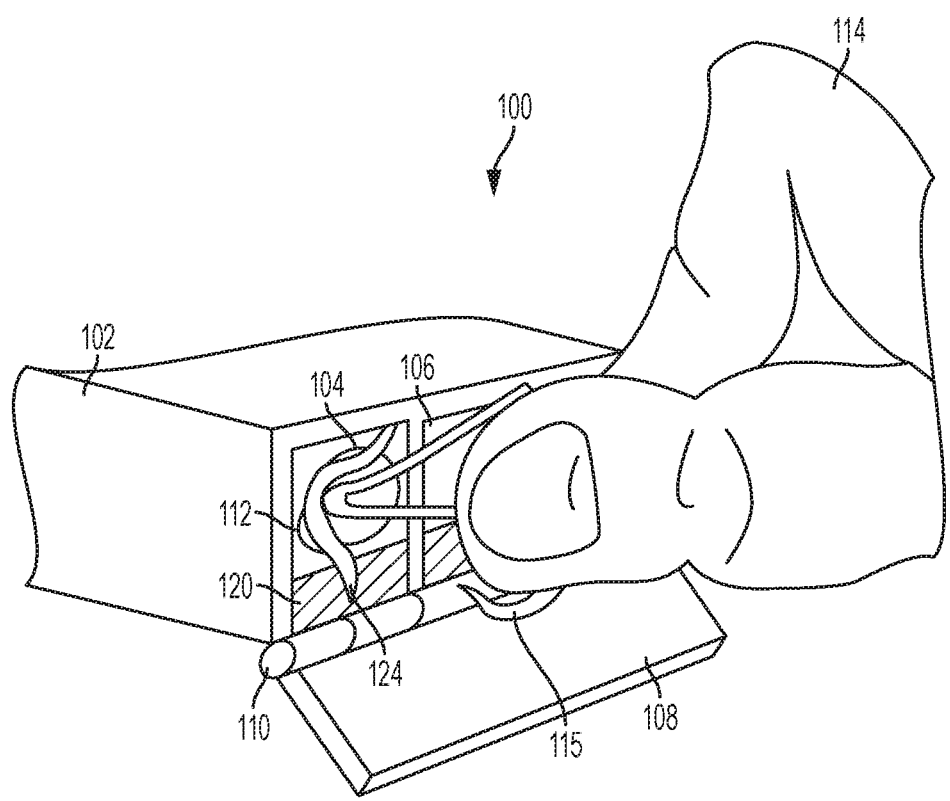
FIG. 1 is a perspective diagram illustrating an example of a carry and storage device for storing fishing lures, in accordance with some embodiments.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein the term "lure" or "fishing lure" refers to an artificial bait used for fishing that includes a hook, sometimes a hook with one or more prongs, and a body. The term "lure" and related terms should not be takin in a limiting sense. Rather it should be understood that the term may apply to lures, flies, jigs, or other artificial bait to be stored in a carry and storage box as described herein. In some examples a lure has multiple hooks placed on the body, in addition to one placed at the end.

In addition, while the term "fly" and related terms are used throughout, such terms should not be taken in a limiting sense unless the context indicates otherwise, a fly is used interchangeably with the term lure as set forth above.

As briefly touched on above, articulated flies present unique storage problems over conventional flies do to the construction of the flies. Articulated flies include a head portion that is connected to the hook portion. This connection has many degrees of freedom of movement that, while useful in fishing, present problems with storage. For example, when placed in a common tackle box, the hooks and/or heads of the flies can become tangled, with themselves or other flies. Even when placed in individual storage compartments, the non-ridged structure of the articulated flies makes them prone to self-fouling, essentially bunching up on themselves and possibly distorting the desired shape of the files. The same problems also apply to fishing lures. For example, many fishing lures include multiple hooks on the body of the lure. Thus storage of such lures in a common area can lead to entanglement as well as destruction of some soft body lures.

To solve the above problems, provided herein is a unique storage and carrying device for fishing flies, and, in particular, articulated fishing flies. In embodiments, the device can be placed with standard tackle, such as in a box, or it can be placed in a pocket, such as a shirt or fishing vest pocket, such that the flies can be easily reached when out on a river, stream or pond. While the disclosed storage and carry device is particularly suited for fishing flies, at is also well suited to hold standard and non-standard fishing lures, for example fishing lures having a body and a trailing hook. Because many lures have multiple hooks disposed on the body portion of the lure, the disclosed storage and carrying device is particularly useful in keeping those lures from becoming tangled with each other and/or damaging soft bodied lures.

Embodiments of the present disclosure include techniques and configurations for a carry and storage device for storing a fishing lure having a hook and a body, for example a fishing fly, such as an articulated fly. In accordance with the embodiments, a carry and storage device may include a device body having at least one fishing lure storage slot, such as a fishing fly storage slot, disposed inside the device body with an opening to receive a fishing lure. For example, the device body may have a plurality of fishing lure storage slots disposed inside the device body each having an opening to receive a fishing lure, such that the fishing lure is disposed within the fishing lure storage slot and does not contact the fishing lure in the other slots of the device. The carry and storage device also includes a lid, such as a lid that is movably coupled to the device body. The lid may be movable between an open position to expose the slot for placing the fishing lure inside and a closed position to cover the slot effectively securing the fishing lure within the device and specifically within a fishing lure storage slot of the device. The carry and storage device includes a hook holding element.

A combination of the slot, lid, and hook holding element provides a unique structure that keeps the fishing lures, such as articulated fishing flies, separate and free from fouling. By way of example with respect to articulated fishing flies, by holding the fly hook stationary in the hook holding element, the remainder of the fly, including the body which provides the flash etc., sits within the fishing lure storage slot. The body of the fly is thus prevented from negatively interacting with either the hook or other files, which prevents distortion or other fouling of the flies, and in particular articulated flies.

In embodiments, the hook holding element may include or more hook receiving slots disposed in the hook holding element and running parallel to a long axis of the at least one fly storage slot, for example, when the carry and storage device is closed. The hook receiving slot is configured to receive at least a portion of the fishing lure hook, for example, to hold the hook in place in response to at least partial disposition of the fishing lure in the slot. In embodiments, the hook receiving slot is substantially wedge shaped, such that a hook can be pushed or placed in the wedge shaped slot and held there by the pinching action of the wedge shaped slot. In embodiments, the hook holding element is in a form of a slotted pliable material. In embodiments, the pliable material includes foam. While foam is a solution to the hook holding element, other solutions may be possible. For example, the hook holding element may include a plurality of vertically oriented clips. The hook holding element may also include un-slotted portions of foam, cork, or other suitable material. Such solution may rely on the point of the hook being embedded for the hook to be held. That may require the hook to be placed point first, i.e., from the opposite direction, which may be difficult within the confines of the device body and/or lid.

In embodiments, the lid includes an inner surface and may include a hook holding element disposed on the inner surface of the lid, for example, opposite an open end of a corresponding fly storage slot, to receive at least a portion of the fishing lure hook in response to at least partial disposition of the fishing lure in the slot. In embodiments, in which the hook holding element is disposed on the inner surface of the lid, the fishing lure hook, in response to a movement of the lid between the open and closed positions, may push the fishing lure body inside the slot, to place the fly fully or substantially inside the fishing lure storage slot. For example, this articulated nature of the lid and device body is similar to the articulated nature of an articulated fly, in that as the lid is opened (e.g. articulated) the articulation of the fly in response to the opening presents the back side of the hook to an end user. This provides for a very easy and unique way in which the fly can be removed from the storage and carrying device. Furthermore, by presenting the fly in this way the chances of unintentionally poking or cutting oneself on the point of the hook are minimized.

As disclosed, the device body and lid of the carry and storage device are movably coupled. In some embodiments, the device body and lid are movably coupled by a hinge disposed between the device body and the lid that facilitates movement between the device body and the lid. In embodiments, the carry and storage device further includes a latch on the lid and a latch mating element on the device body. The inclusion of a latch allows the device to be closed securely. In some embodiments, the lid includes a head space, for example to accommodate the size and shape of the curved portion of the hook, or to provide space for the hook holding element.

In embodiments, the hook holding element includes at least one of: foam; cork; a metal clip; or a plastic clip.

In embodiments, the at least one fishing lure storage slot includes an inner surface, and the hook holding element is disposed on the inner surface of the at least one fishing lure storage slot.

The device body has a front side and a back side where the lid is coupled. In embodiments, the front side has a first length and the backside has a second length that is greater than the first length resulting in a wedge shaped profile of the opening of the fly storage slots. The lid may be configured to match the wedge shaped profile of the opening to cover the openings in the closed position. In embodiments, the lid meets the device body at an angle greater than 10 degrees relative to the long axis of the fly storage slot.

The described embodiments of the carry and storage device may be made from solid material, such as plastic, glass, metal, wood, and the like. The device may have at least one side (e.g., face side) made of a transparent material, to provide a clear view of the device contents. The device may be fabricated waterproof and/or may be constructed to float in water. A close-fitting gasket around the edges of the lid of the device, and/or a tight latch may contribute to waterproof embodiments.

In embodiments, the carry and storage device may have exterior corners that are substantially square. In some embodiments, its outer corners may include a substantially rounded shape, such as a quarter round, or even having an entire side that is round and/or ovoid in shape. In embodiments, a built-in loop, though not shown in the Figures, may be added to the device, to allow a lanyard or other attachment, for example to secure the device from falling into a body of water.

While embodiments shown in the Figures describe the carry and storage device having a single body (e.g., 302), in some embodiments, a double box comprising duplicate boxes, for example, placed back-to-back may be contemplated. Such embodiments may at least double the capacity of the device and fit into a user's pocket. Additionally, a device body may include a plurality of slots, on each side of the device body having varied width of the slots. Further, one side of the body may include the slots as described above, while the other side may include a conventional compartment arrangement, allowing the angler to carry a mix of articulated and smaller, conventional flies.

While the figures depict the carry and storage device for use with fishing flies, and in particular articulated flies, it is contemplated that the carry and storage device could be used with any artificial bait, particularly a fishing lure having a hook and a body.

FIG. 1 is a diagram illustrating an example embodiment of a carry and storage device, in this example used for storing fishing flies. The device 100 includes a device body 102 comprising a plurality of individual compartments (slots) 104, 106, etc. each configured to store a fishing fly 112, including articulated and non-articulated flies as well as other lures. As shown in FIG. 1, slots 104, 106 have a generally rectangular opening, such as a substantially square opening. Slots 104, 106 may be covered by a lid 108 (e.g., flip-top lid), which may be coupled with, e.g., movably attached to body 102, such as with a hinge 110. Individual slots 104, 106 may provide for keeping flies from tangling, for example with other files in carry and storage device 100. To access a fly stored in slot 104 (106), a user may shake device 100 to get fly 112 to slide out, to be available for grabbing by user's fingers 114. In the embodiment shown, each slot includes a hook holding element 120. Hook holding element 120 may include hook receiving slots 124 that are generally wedge or groove shaped to receive a fly hook 115. The inclusion of hook receiving slots 124 provides for secure placement of fly hook 115 into storage and carry device 100 and helps to prevent fly 112 from sliding deep within slots 104, 106 and becoming misshapen, for example preventing feathers, fur, synthetic material, or other material from deforming from a desired shape. Hook holding element 120 may include a piece of foam, cork, or a clip of metal or plastic that may be attached (e.g., adhered) to the open end of slot 104 as shown.

Figure 2A:
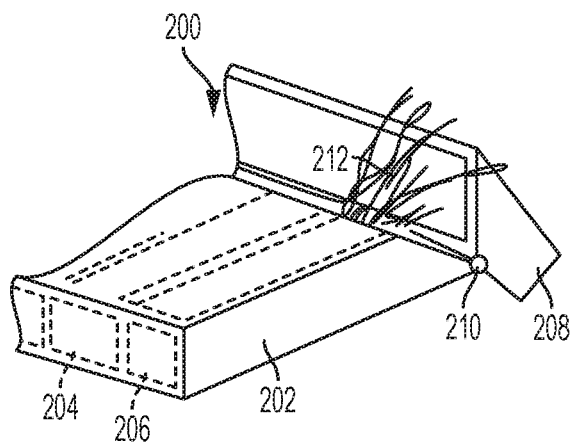
FIG. 2A is a perspective diagram illustrating an example of a carry and storage device for storing fishing lures, in accordance with some embodiments.
Figure 2B:
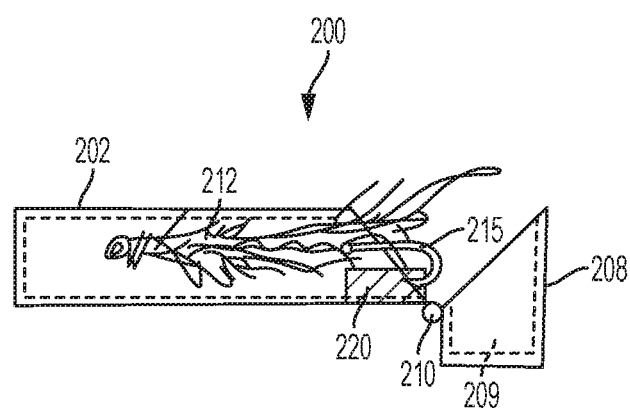
FIG. 2B is a side view diagram illustrating an example of a carry and storage device for storing fishing lures shown in FIG. 2A, in accordance with some embodiments.

FIGS. 2A and 2B are two diagrams illustrating perspective and side views, respectively, of another example embodiment of a carry and storage device for storing fishing flies. The dashed lines are meant to depict the interior walls of the device. Similar to the embodiment shown in FIG. 1, a device 200 includes a device body 202 including a plurality of individual compartments (slots) 204, 206, each configured to store a fishing fly. Slots 204, 206 may be covered by a lid 208, which may be movably attached to body 202, e.g., with a hinge 210. Device 200 may further include, at the open end of each slot 204, 206, a hook holding element 220 to secure a hook 215 of a fly 212 stored in slot 206, as shown in FIG. 2. Hook holding element 220 may include a piece of foam, cork, or a clip of metal or plastic that may be attached (e.g., adhered) to the open end of slot 204 as shown. In the embodiment shown, lid 208 meets device body 202 at an angle when the device is closed, for example greater than about 0 degrees to about 60 degrees, for example 45 degrees. By angling lid 208 and device body 202 this way, the device provides for easy access to fly 212 and/or fly hook 215. As best seen in FIG. 2B, lid 208 includes a head space 209, that when closed allows for space to accommodate fly 212 and/or fly hook 215.

Figure 3:
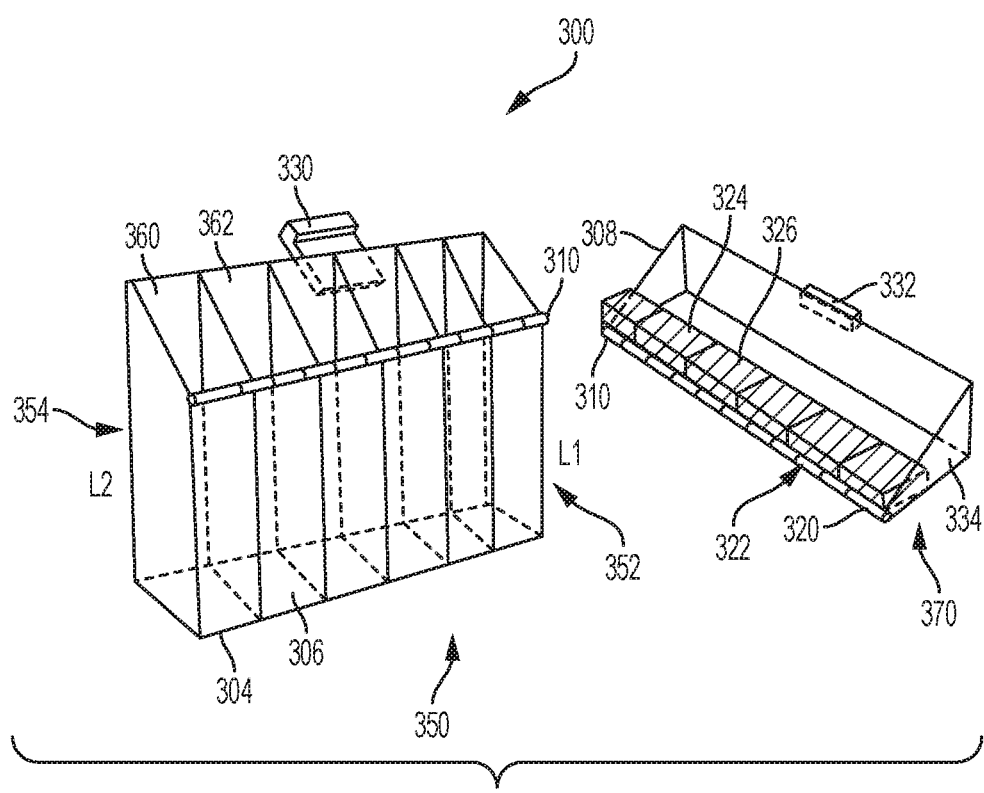
FIG. 3 is a diagram illustrating of another example of a carry and storage device for storing fishing lures, in accordance with some embodiments.

FIG. 3 illustrates another embodiment of a carry and storage device for storing fishing flies. FIG. 3 shows a carry and storage device 300 disassembled in two sections, as shown in views 350 and 370. Similar to earlier described embodiments, device 300 may include a device body 302 shown in view 350 that includes a plurality of individual compartments (slots) 304, 306, each configured to store a fishing fly. While FIG. 3 shows six compartments (slots), one skilled in the art will appreciate that any number of slots 304, 306 may be feasible in various embodiments.

Slots 304, 306 may be covered by a lid 308 (shown in view 370), which may be movably attached to body 302, e.g., with a hinge 310. A generic latch 330 with a mating component 332 may be used, to enable locking of lid 308 to the body 302, for example during use, such as in a tackle box or shirt or vest pocket. In embodiments, a first side 352 of body 302 may have a first length L1, and a second side 354 may have a second length L2, which may be greater than L1. Accordingly, respective openings 360, 362 of slots 304, 306 may include wedge-like shapes, as shown in view 350. Lid 308 may be configured to match the shape of openings 360, 362, for example, to cover openings 360, 362 in the closed position.

In the embodiment shown, lid 308 may be configured to house a hook holding element 320. Hook holding element 320 may be disposed on an inner surface 334 of lid 308 opposite latch mating component 332, as shown in view 370. Hook holding element 320 may include a strip 322 (for example, formed with foam or cork) with wedged hook receiving slots 324, 326 that may be cut in strip 322 to receive fly hooks (not shown). As lid 308 opens, space may be created for the user to put the hook in or take it out of slot 304, 306. When placing the fly inside the slot, the head end of the fly may be first allowed to be at least partially disposed inside (e.g., fall into or be placed into) slot 304, 306. With the hook in place in hook receiving slot 324 of hook holding element 320, closing the lid may further advance the fly down slot 304, 306. Because the streaming features, the feathers and flash of the fly generally do not protrude past the bend of the hook, they may be fully or substantially contained inside slot 324, 326 at closure. The example shown is particularly useful for flies having an articulated hook, e.g. one that articulates relative to the body of the fly.

FIGS. 4-7 illustrate different views of the example device shown in FIG. 3, demonstrating the device in use.

FIG. 4 illustrates a side view of device 300 with lid 308 including fly holding device (slotted foam) 320 open about 90 degrees from body 302 about hinge 310. Note that depending on the choice and alignment of hinge 310, an opening up to 180 degrees is conceivable. Arrow 400 depicts the relative movement of lid 308 as it is moved from the open position to the closed position.

FIG. 5 illustrates a side view of device 300 substantially as shown in FIG. 4, but with an articulated fly 512 placed such that a fly hook 515 is at least partially placed inside a hook receiving slot (not shown) of hook holding element 320. Moving lid 308 (as shown in 400 of FIG. 4) from an open to a closed position may cause hook 515 to force (gently) fly 512 down slot 304, as indicated by arrow 518.

FIG. 6 illustrates a side view of device 300 with articulated fly 512 in place with lid 308 closed and latched with latch 330 to mating component 332. The feather and flash of fly 512 may have been substantially fully disposed inside slot 304 while hook 515 remains engaged with hook holding element 320.

FIG. 7 illustrates a front view of the device 300 with lid 308 closed and fly 512 secured within slot 304. Hook receiving slots 324, 326 of hook holding element 320 are shown in this view.

Figure 8:
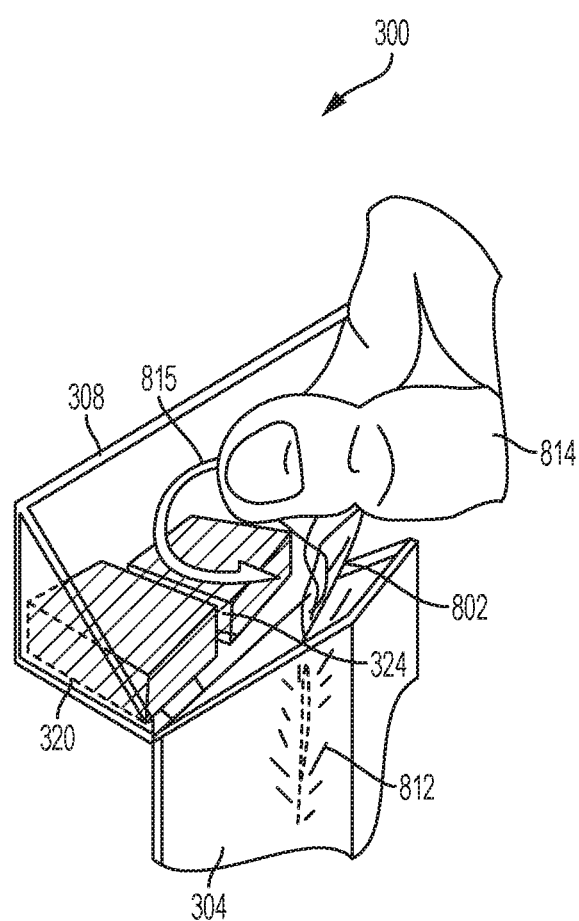

FIG. 8 illustrates a perspective view of device 300 with a hook 815 of a string fly 812 with the body already down the slot 304. Placing hook holding element 320 (slotted foam shown) on lid 308 may create space for the user's fingers 814 to place hook 815 of fly 812 in hook receiving slot 324 and/or remove hook 815 from hook receiving slot 324 without obstacles.

While carry and storage device described in FIGS. 1-8 is shown as having angled corners, in some embodiments its outer corners may comprise substantially rounded shape. A built-in loop, though not shown, may be added to the device, to allow a lanyard or other attachment.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A carry and storage device combined with a fishing lure comprising a fishing lure hook coupled with a fishing lure body, wherein the device comprises:
  a device body having at least one fishing lure storage slot disposed inside the device body with an opening holding the fishing lure body;
  a lid hingedly coupled to the device body, to be movable between an open position to expose the at least one fishing lure storage slot for placing the fishing lure body at least partially inside the at least one fishing lure storage slot and a closed position to cover the at least one fishing lure storage slot; and
  a hook holding element retaining and securing at least a portion of the fishing lure hook within the hook holding element,
  wherein the lid includes an inner volume and an inner surface, and wherein the hook holding element is disposed on the inner surface of the lid and occupies at least a portion of the inner volume of the lid, wherein the hook holding element is disposed opposite an open end of the at least one fishing lure storage slot,
  wherein the lid, hook holding element and at least one fishing lure storage slot are configured such that movement of the lid from the closed position to the open position pulls the fishing lure body at least partially out of the at least one fishing lure storage slot, and movement of the lid from the open to the closed position at least partially pushes the fishing lure body into the at least one fishing lure storage slot.

2. The carry and storage device of claim 1, wherein the hook holding element comprises one or more hook receiving slots disposed in the hook holding element.

3. The carry and storage device of claim 1, further comprising a latch on the lid and a latch mating element on the device body.

4. The carry and storage device of claim 1, wherein the hook holding element includes at least one of: foam; cork; a metal clip; or a plastic clip.

5. The carry and storage device of claim 1, wherein the lid meets the device body at an angle greater than 10 degrees.

6. The carry and storage device of claim 1, wherein the device body comprises:
  a front side; and
  a back side where the lid is coupled, and wherein the front side has a first length and the backside has a second length that is greater than the first length resulting in a wedge shaped profile of the opening of the at least one fishing lure storage slot, and wherein the lid is configured to match the wedge shaped profile of the opening to cover the opening in the closed position.

7. A carry and storage system, comprising:
  a fishing lure having a fishing lure hook coupled with a fishing lure body;
  a device body having at least one fishing lure storage slot disposed inside the device body to receive the fishing lure body;
  a hook holding element retaining and securing at least a portion of the fishing lure hook within the hook holding element; and
  a lid hingedly attached to the device body, to be movable between an open position to expose the at least one fishing lure storage slot for placing the fishing lure body at least partially inside the at least one fishing lure storage slot and a closed position to cover the at least one fishing lure storage slot, wherein the lid includes an inner volume and an inner surface and the hook holding element is disposed on the inner surface of the lid and occupies at least a portion of the inner volume of the lid, wherein the hook holding element is disposed opposite an open end of the at least one fishing lure storage slot,
  wherein the lid, hook holding element and at least one fishing lure storage slot are configured such that movement of the lid from the closed position to the open position pulls the fishing lure body at least partially out of the at least one fishing lure storage slot, and movement of the lid from the open to the closed position at least partially pushes the fishing lure body into the at least one fishing lure storage slot.

8. The carry and storage system of claim 7, wherein the hook holding element comprises one or more hook receiving slots disposed in the hook holding element and, in the closed position, running parallel to a long axis of the at least one fishing lure storage slot and retaining at least a portion of the fishing lure hook.

9. The carry and storage system of claim 8, wherein the hook holding element includes at least one of: foam; cork; a metal clip; or a plastic clip attached to the inner surface of the lid.

10. The carry and storage system of claim 7, further comprising a latch on the lid and a latch mating element on the device body.

11. The carry and storage system of claim 7, wherein the device body has a front side and a back side where the lid is coupled and wherein the front side has a first length and the backside has a second length that is greater than the first length resulting in a wedge shaped profile of an opening of the at least one fishing lure storage slot, and wherein the lid is configured to match the wedge shaped profile of the opening to cover the opening in the closed position.

12. The carry and storage system of claim 7, wherein the lid meets the device body at an angle greater than 10 degrees.

13. A method for carrying and storing a fishing lure having a fishing lure hook coupled with a fishing lure body, wherein the method comprises:
- opening a lid on a device body, wherein the lid is hingedly coupled to the device body to be movable between an open position to expose a fishing lure storage slot for placing the fishing lure body at least partially inside the fishing lure storage slot and a closed position to cover the fishing lure storage slot;
- placing at least a portion of the fishing lure body within the fishing lure storage slot disposed inside the device body, the fishing lure storage slot having an opening holding the fishing lure body; and
- placing the fishing lure hook into a hook holding element to retain and secure at least a portion of the fishing lure hook within the hook holding element, wherein the lid includes an inner volume and an inner surface, and wherein the hook holding element is disposed on the inner surface of the lid and occupies at least a portion of the inner volume of the lid, wherein the hook holding element is disposed opposite an open end of the fishing lure storage slot,
- wherein the lid, hook holding element and fishing lure storage slot are configured such that movement of the lid from the closed position to the open position pulls the fishing lure body at least partially out of the fishing lure storage slot, and movement of the lid from the open to the closed position at least partially pushes the fishing lure body into the fishing lure storage slot.

* * * * *